United States Patent
Rebordosa et al.

(10) Patent No.: US 6,676,051 B2
(45) Date of Patent: Jan. 13, 2004

(54) DEVICE FOR CHOPPING FOOD

(75) Inventors: Antonio Rebordosa, Barcelona (ES); Mariano Peñaranda, Barcelona (ES); Juan Carlos Coronado, Barcelona (ES); José Luis Román, Barcelona (ES)

(73) Assignee: Braun GmbH (DE)

( * ) Notice: Subject to any disclaimer, the term of this patent is extended or adjusted under 35 U.S.C. 154(b) by 0 days.

(21) Appl. No.: 09/748,985

(22) Filed: Dec. 27, 2000

(65) Prior Publication Data

US 2001/0008258 A1 Jul. 19, 2001

(30) Foreign Application Priority Data

Jan. 15, 2000 (DE) .......................... 100 01 455

(51) Int. Cl.$^7$ .............................. A47J 43/044
(52) U.S. Cl. ................ 241/73; 241/282.1; 241/DIG. 17
(58) Field of Search ..................... 241/69, 74, 73, 241/100, 199.12, 282.1, 282.2, DIG. 17

(56) References Cited

U.S. PATENT DOCUMENTS

| | | | |
|---|---|---|---|
| 2,449,666 A | | 9/1948 | Moseley |
| 3,761,026 A | * | 9/1973 | Rohmer ................. 241/199.12 |
| 4,243,180 A | * | 1/1981 | Bonnel ...................... 241/79.2 |
| 4,487,371 A | * | 12/1984 | Day ............................. 241/48 |
| 4,605,173 A | | 8/1986 | Edmonds |
| 4,759,507 A | | 7/1988 | Lynch et al. |
| 5,360,170 A | | 11/1994 | Cartellone |
| 5,607,062 A | * | 3/1997 | Poser et al. ................. 209/283 |
| 5,765,767 A | | 6/1998 | Iwata et al. |

FOREIGN PATENT DOCUMENTS

| | | |
|---|---|---|
| DE | 928 788 | 6/1955 |
| DE | 6921181 | 5/1969 |
| DE | 197 37 130 | 6/1999 |
| EP | 0 174 407 | 3/1986 |
| EP | 0 221 392 | 5/1987 |
| FR | 1 143 914 | 10/1957 |

* cited by examiner

*Primary Examiner*—Mark Rosenbaum
(74) *Attorney, Agent, or Firm*—Fish & Richardson PC

(57) ABSTRACT

The invention is directed to a device for chopping food, in particular ice cubes, which includes a container body (2) subdivided into an upper processing zone (20) and a lower collecting zone (21). The rotary chopping tool (3) received in the processing zone (20) serves to comminute the food materials. A sieve (4; 25; 26) is provided in the transition region from the processing zone (20) to the collecting zone (21). The device of the invention has the advantage of enabling both foodstuffs and ice cubes to be reduced to defined sizes readily. In addition, ice cubes may be reduced without major amounts of energy being absorbed by the chopping tool (3) and without the reduced parts beginning to melt.

34 Claims, 5 Drawing Sheets

DEVICE FOR CHOPPING FOOD

This invention relates to a device for chopping food, particularly ice cubes, according to the prior-art portion of patent claim 1.

The prior art knows of a multiplicity of devices for chopping food. For example, EP-A-0 211 392 and U.S. Pat. No. 5,360,170 describe an attachment for an electric kitchen appliance having a freely rotatable chopping tool mounted on the bottom of a cylindrical container. Food such as fruit, vegetables, ice cubes or the like is chopped by a part of the food being severed by the blades of the chopping tool with each rotation. The fact that the chopping tool is positioned in close proximity to the bottom means that the food which comes to rest in the lower part of the container is chopped more often than the food which comes to rest in the upper part of the container unless the food is optimally mixed.

EP-A-0 174 407 describes a device of the type initially referred to, in particular for chopping ice cubes, having an upper container equipped with a processing zone for chopping the food and an adjoining collecting zone for receiving the food. The unprocessed ice cubes are held in a rotary cylinder of the processing zone, which is enclosed by a cup-shaped housing equipped with a crank and a pressure plate. Together with a rim the housing forms the actual lid which closes off the container receiving the chopped food. Pressure is exerted on the ice cubes by the pressure plate resting on the ice cubes. The fact that the pressure plate is non-rotatably but axially slidably connected with the rotary cylinder means that said cylinder is set in rotation when the crank is turned. A blade is arranged in radial direction on the bottom of the lid, quasi like a plane. When the device is operated the ice cubes are "shaved" into fine slivers by the rotary movement and the pressure exerted by the pressure plate. The ice slivers then drop into the lower lying collecting zone of the container.

With this device the rotary movement has to be accompanied by vertical pressure applied from above via the pressure plate onto the ice cubes, which requires an accordingly elaborate bearing arrangement. Furthermore, the size of the ice slivers is determined by the plane gap and can be varied to only a very small extent. The chopped pieces of ice are comprised preferably of sliver-shaped, thin sections of a pulp-like nature. A relatively great effort is required to cut ice. Furthermore, ice is generally difficult to cut because it can easily slip off the cutter during the slightest rotary movements.

It is an object of the present invention to eliminate the disadvantages of the prior art described and to provide an improved solution of a device for chopping food, particularly pieces of ice, raw firm vegetables, dried fruit etc., which may also be used as an energy-consuming attachment on existing kitchen appliances driven by an electric motor to chop food, particularly pieces of ice, in simple manner so that said pieces of ice do not exceed a certain size nor are too small.

This object is accomplished by a device with the features of patent claim 1. Advantageous embodiments of the invention are described in the sub-claims. The advantage of the device according to the invention is, on the one hand, that food materials such as ice cubes, nuts, vegetable salads etc. have to be reduced once they attain a certain size. This saves energy and results in a relatively uniform size of reduced food particles. On the other hand this means that in addition to dried fruit and raw but firm vegetables it is also possible to reduce ice cubes without the chopping tool absorbing energy in major amounts and without the reduced parts beginning to melt. The embodiment of the invention with the features of patent claim 1 may provide, for example, a stainless steel sieve, a plastic sieve or a wire sieve. It is possible for said sieve to be cylindrical, conical or hemispherical, for example. The size of the food particles which, after being chopped, may enter the collecting zone from the processing zone may be determined by suitable selection of the sieve openings.

In this embodiment the processing zone and the collecting zone are preferably arranged vertically one above the other in the container body which, for example, may take the shape of a cylinder, the frustum of a cone or some other hollow form. By arranging the processing zone above the collecting zone, the chopped food materials may ultimately drop from top to bottom by force of gravity, enabling the unprocessed food in the processing zone to be moved from top to bottom towards the bite of the processing tool. According to the invention the movement needed to chop the food is ensured by the rotating processing tool which by virtue of its high speed of rotation not only chops or disintegrates and/or shreds the food but also forces or centrifuges the food materials out through the openings when they have become small enough. As a result of the bearing pin arrangement on the sieve bottom the tool spindle bearing arrangement is restricted to only the chopping device. The bearing arrangement takes the form, for example, of a sliding bearing, i.e., mounted on the tool spindle is a soft metal bushing made of brass, for example, into which a bearing pin projects. In this arrangement the bearing pin is fastened to the bottom of the sieve, for example. The sieve bottom acts simultaneously as the running surface for the soft metal bearing bushing. This arrangement affords simplicity and economy of manufacture.

It is particularly advantageous for the sieve to be constructed with the features of patent claim 2. This construction enables the food to be fed either through the openings in the bottom, through the openings in the side wall or through both sieve zones provided that openings are constructed there. With lateral openings (claim 3) and the relatively high speed of the processing tool, the chopped food materials are centrifuged at a high centrifugal force against the openings and forced out through the openings. High speeds may be reached in particular with devices driven by an electric motor. Only such food remains therefore in the processing zone as has not yet attained the size of the openings in the sieve.

A particular advantage is the speedy processing of the food accomplished by an embodiment in which the chopping tool has its full circumference surrounded by a downwardly tapering sieve wall. The sieve wall may also be constructed as a truncated cone.

The features of patent claim 4 disclose a further advantageous embodiment of the present invention. The chopping device may thus be put to various uses to accommodate different types of food and different degrees of chopping. For example, it is possible to produce coarsely chopped vegetable salads and fine fruit purees. Throughput can be varied by means of counter-rotating sieves having registering transverse slits which are opened to a greater or lesser degree by turning.

The features of patent claim 5 disclose a further advantageous aspect of the present invention. Such a construction is particularly hygienic because it also enables the sieve holder to be removed from the container body for cleaning. By providing for different sieve holders it is also easy to adapt the present invention to different kitchen appliances and different chopping tools. The sieve holder may be made either of metal or of plastic. At its lower end it has an inwardly projecting rim or collar in which a circumferential holding rim of the sieve or projecting holding lugs of the sieve are held.

A further advantageous embodiment of the present invention provides for a construction with the features of patent claim 6. In this construction the vertical ribs extending parallel to the center axis of the container cooperate with corresponding cutouts in the wall of the sieve holder. Here the ribs perform a dual function. On the one hand they serve as a guide for the sieve holder, on the other hand they provide the sieve holder with an upper stop hence serving as a vertical positioning device for the sieve holder. The sieve holder is thus fixed, i.e., carried in its vertical position, and simultaneously secured against being turned as, for example, by the particles of food rotating as a result of the rotary movement of the chopping tool.

In this arrangement the chopping tool is advantageously constructed in accordance with the features of patent claim 7. It is also possible, however, to use a different suitable construction other than blades. In particular in cases where four blades are used, rotation without imbalance and highly effective chopping of food results.

The blades are of different construction in accordance with the features of patent claim 8, for example. This prevents skimming of the chopping tool over the bed of food particles needing to be displaced as it rotates in hydroplane fashion.

It is particularly advantageous for the present invention to be constructed with the features of patent claim 9 because then there is no need for the device to have its own drive unit but instead may use the drive unit of a kitchen appliance which is required in any case in the household.

Finally, it is an advantage for the sieve to be interchangeable, thus enabling the use of coarser, finer or adjustable sieves (claim 10).

Further aspects and advantages of the present invention will be explained in the following by the description of the embodiments with reference to the accompanying drawings. In the drawings, FIG. 1 is an exploded perspective view of an advantageous embodiment of the present invention;

Figure 1:
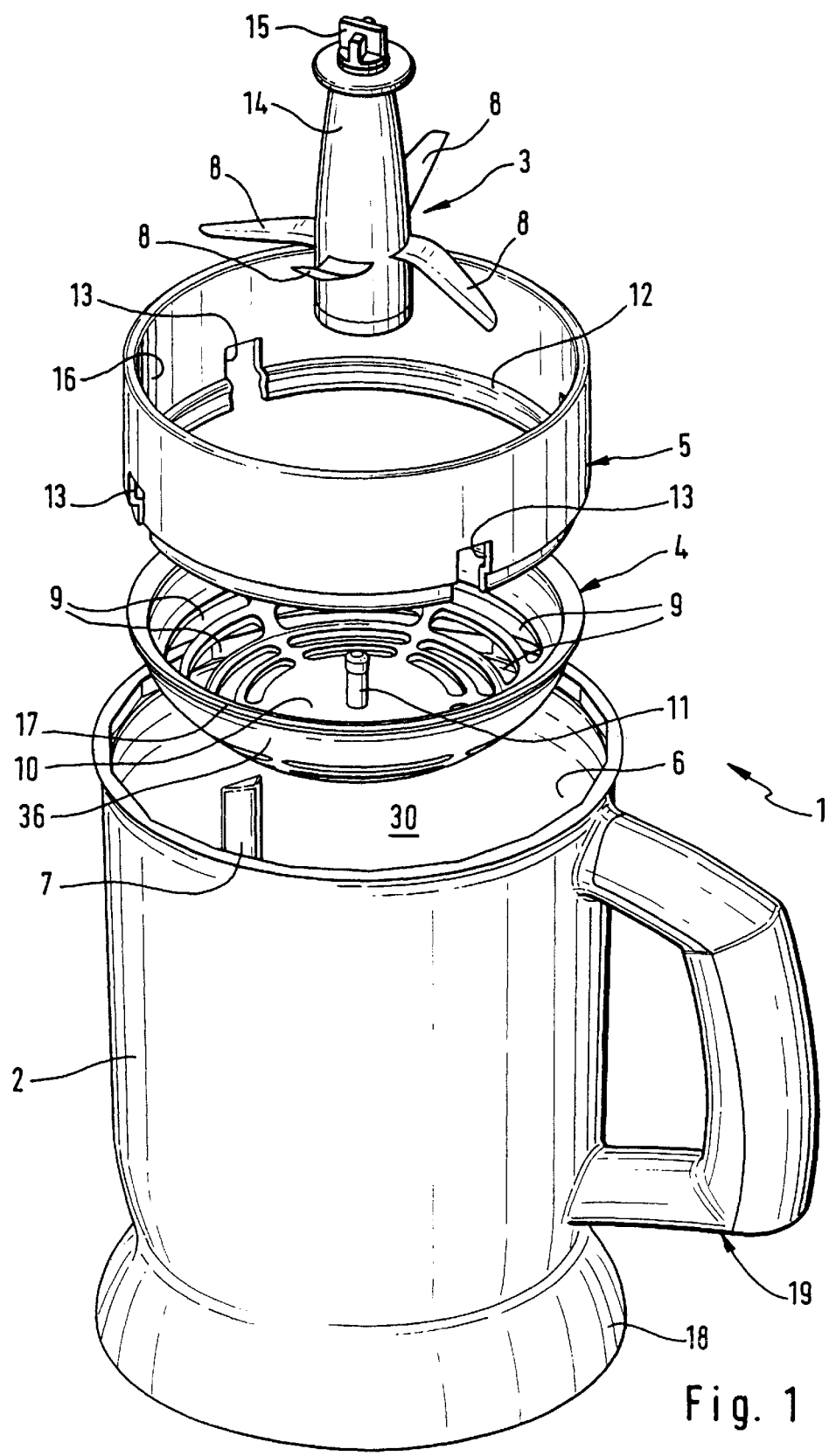
Figure 2:
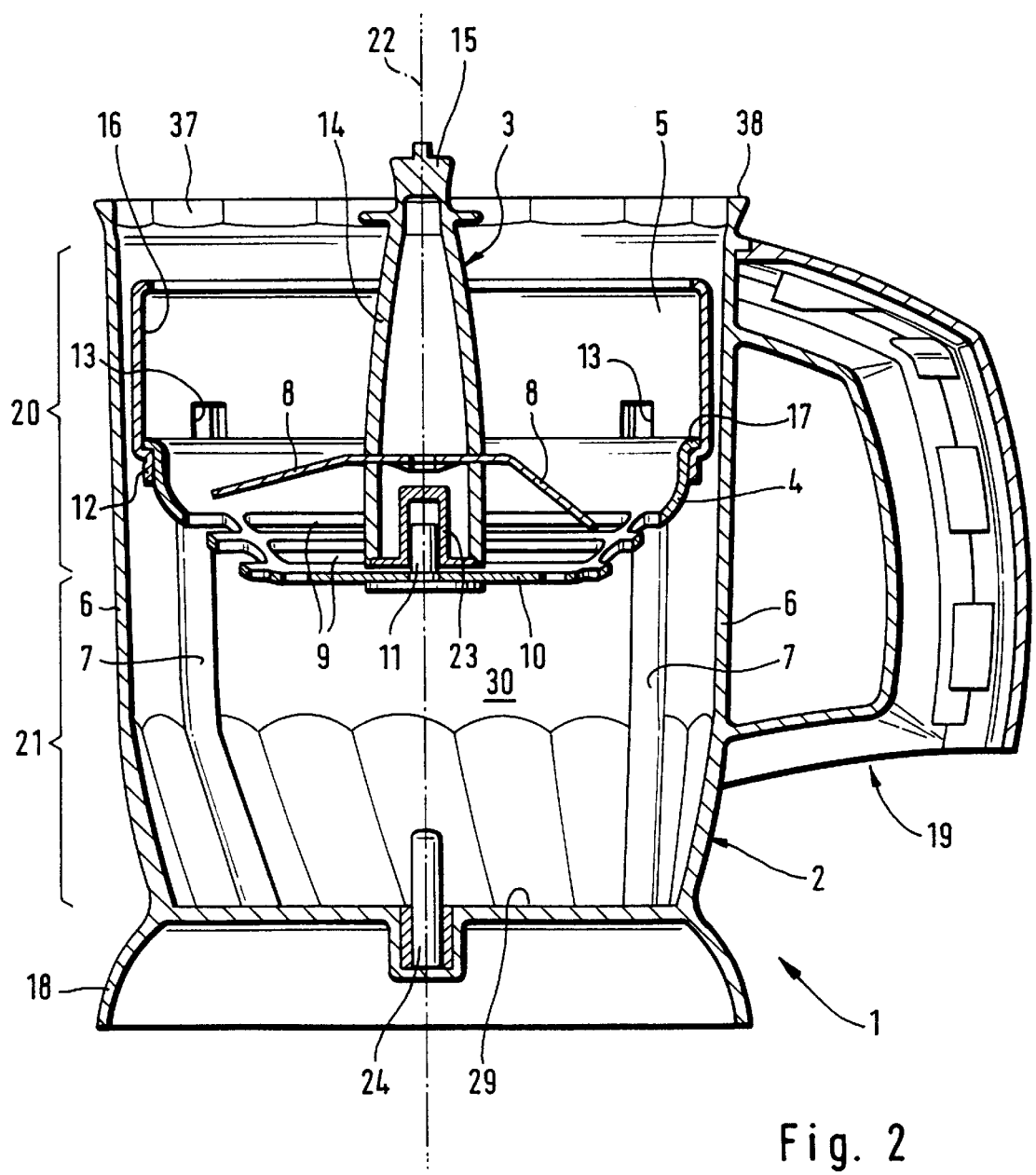
FIG. 2 is a longitudinal sectional view of the device of FIG. 1.
Figure 3:
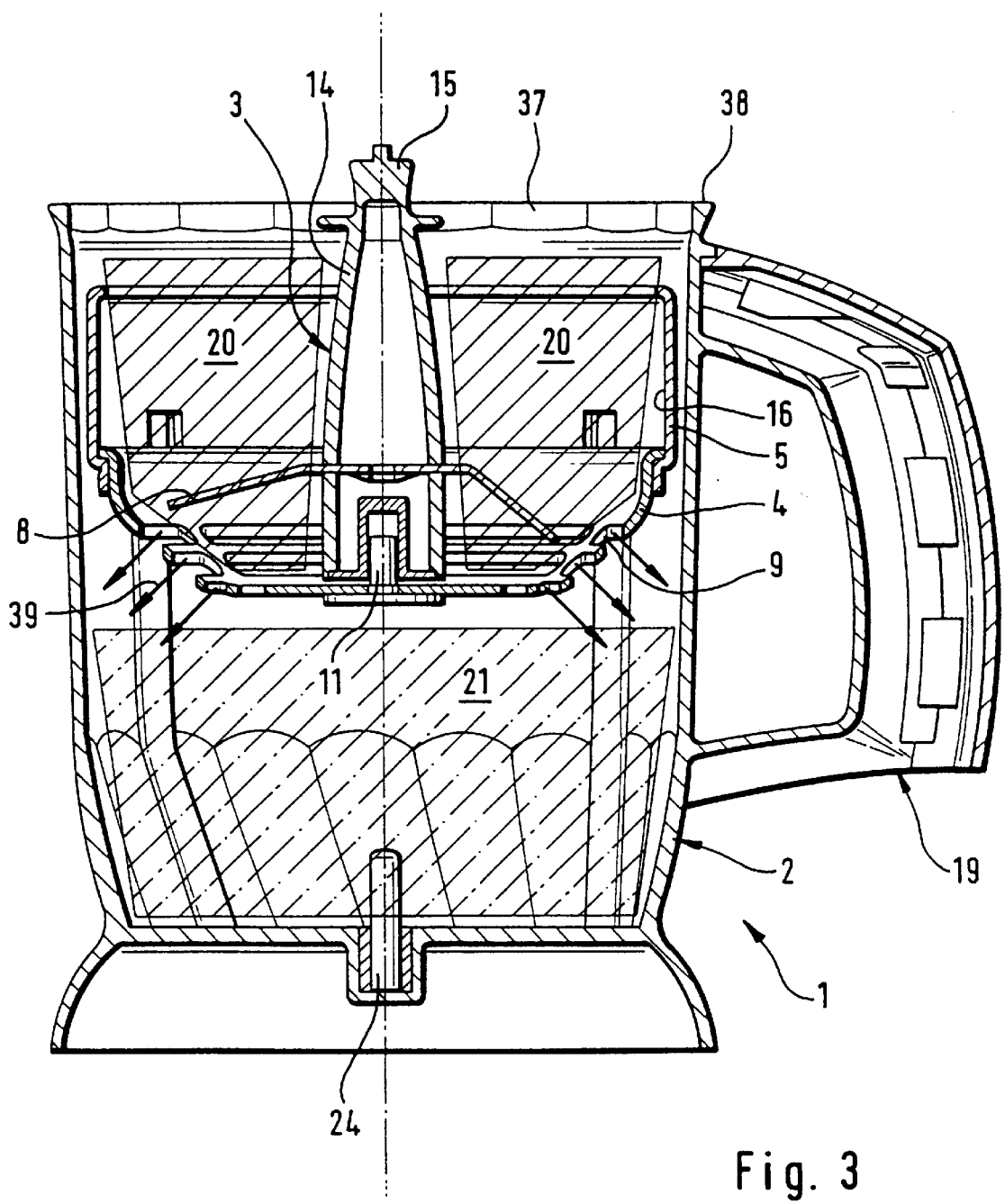
FIG. 3 is a longitudinal sectional view of the device of FIG. 1 and FIG. 2 illustrating schematically the function thereof.

FIGS. 1 to 3 show an advantageous embodiment of a chopping device 1 of the present invention. Said device is shown in an exploded schematic view in FIG. 1. FIGS. 2 and 3 are sectional views of the chopping device 1. Identical or similar components are assigned like reference numerals in the following.

The chopping device 1 includes an essentially cylindrical container body 2 having a container bottom 29 at its lower end. The container body 2 sits on a container foot 18 which is made integrally with the container body 2. The container foot 18 is constructed as a truncated cone whose circumference expands in downward direction. A handle 19 is also integrally formed with the container wall 6 on the side of the container body 2 made of a suitable plastic material. To save weight, the handle 19 is constructed as a U-shaped hollow body.

Arranged in the container interior 30 are four ribs 7 circumferentially spaced apart by 90° of arc. The ribs 7 are integrally formed with the container wall 6 and extend parallel to the center axis 22 of the container body 2. The ribs 7 do not extend over the full height of the container body 2 but end about two-thirds up the container body 2.

The chopping device 1 also has a chopping tool 3 which essentially is made of a tool spindle 14 and blades 8 attached thereto. The tool spindle 14 is a slightly conical hollow turned metal part which is open at its lower wide end. At the upper end of the tool spindle 14 is a spline 15 which acts as a coupling for transmitting power from a drive unit to the chopping device 1. The tool spindle 14 has its lower end closed by a pin mount 23 made of soft metal.

Furthermore, four blades 8 are circumferentially spaced apart by 90° of arc on the outer periphery of the tool spindle 14 in its lower third. The blades 8 are also offset in height and bent at different angles so that the force which they exert on the food is directed also toward the openings 9, 31, 35 in order for the reduced food to pass as quickly as possible through the openings 9, 31, 35 once it has attained the throughput width of the openings 9, 31, 35. This prevents the food from being chopped too severely and ice from being melted too quickly.

In assembled condition, the chopping tool 3 is positioned in the processing zone 20, i.e., in the upper half of the container body 2. Arranged in this processing zone 20 concentrically with the center line 22 are, aside from the chopping tool 3, a sieve 4 and a sieve holder 5. The lower half of the container body 2 acts as a collecting zone 21 for the food chopped in the processing zone 20.

The sieve 4 is of a frusto-conical configuration having side walls 36 which surround the chopping tool 3 and are equipped with elongate slits 9 extending horizontally and parallel to each other. At the narrow lower end is a sieve bottom 10 which has at its center a bearing pin 11 projecting vertically upwardly. The wider upper end of the sieve 4 has open cross section. The sieve 4 is terminated with a circumferential holding rim 17 which projects outwardly like a bead and serves to connect the sieve 4 to a collar 12 at the lower end of the sieve holder 5.

The sieve holder 5 is constructed as a circular ring having on its lower circumference four cutouts 13 circumferentially spaced apart by 90° of arc. The sieve holder 5 is terminated on its lower inner wall 16 by an inwardly projecting bead or collar 12.

During assembly, the sieve 4 is inserted from above into he sieve holder 5 until the holding rim 17 sits on the collar 12. The sieve 4 is then inserted together with the sieve holder 5 in the container body 2 in such a way that the cut-outs 13 in the sieve holder 5 embrace the upper ends of the ribs 7 and are guided by them. Ultimately the sieve holder 5 rests on the upper ends of the ribs 7. The chopping tool 3 is then installed from above so that the bearing pin 11 projecting vertically from the sieve bottom 10 is engaged within the pin mount. The pin mount 23, which is constructed as a soft metal bushing, thus combines with the bearing pin 11 to form a type of sliding bearing for the tool spindle 14.

After the processing zone 20 is filled, the chopping device 1 is covered by a lid, not shown, and coupled via the spline 15 to a drive unit of a kitchen appliance. The lid thus closes the opening of the container body, sitting on its rim. The lid may be part of a housing (not shown) equipped with a gearing, such as is the case, for example, with the extra chopper for the Braun MultiMix quatro pro M880M illustrated, for example, on page 18 of applicant's product range overview "Qualitat in guter Form", 1999/2000 issue.

The journal 24 provided in the container bottom 29 according to FIGS. 2 and 3 acts as a centering and bearing device for another tool when the container body 2 is used as a blender. It therefore performs no function for the device.

When the kitchen appliance is switched on, the tool spindle 14 and hence the chopping tool 3 begin to rotate about the center line 22. The food situated in the processing zone 20 is thus chopped by the rotating blades 8 and whirled around in the processing zone. Once the reduced food attains a lump size smaller than the slits 9 provided in the sieve 4, the food particles pass into the collecting zone 21 of the container body 2, as indicated by arrows 39 in FIG. 3. Other partly chopped food situated in the processing zone 20 moves up to take their place, is further reduced and ultimately also passes into the collecting zone 21. On account of the special construction of the blades 8 the food is whirled around the processing zone 20 at high velocity and force and, as soon as it attains the correct size, is forced or expelled through the openings 9, 31, 35.

Figure 4:
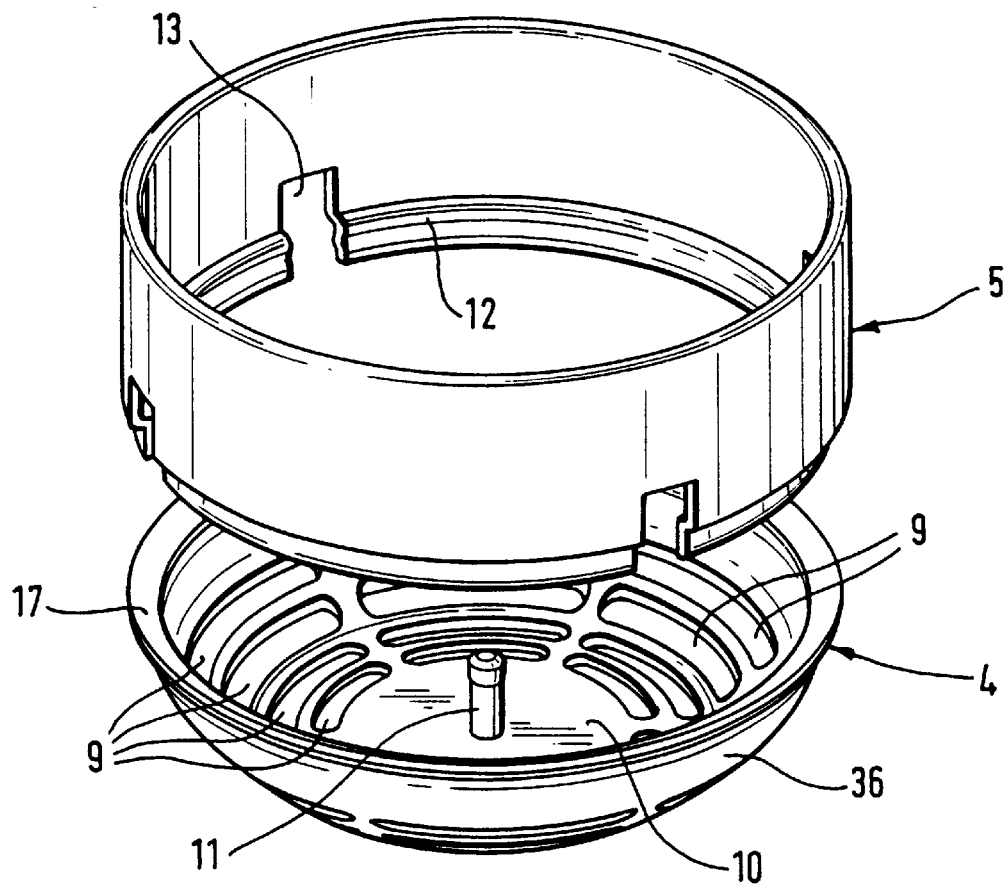
FIG. 4 is perspective detail view of the sieve and the sieve holder of the invention according to the embodiment of FIG. 1.

FIG. 4 shows the sieve 4 and the sieve holder 5 once again in a perspective detail view. It should be noted that the sieve 4 is fitted by inserting it from above through the cylindrical opening of the sieve holder 5 to enable the wider holding rim 17 to come to rest on the collar 12. The slits 9 extending in circumferential direction at different distances from the center axis 22 are also clearly recognizable. The bearing pin 11 used for mounting the chopping tool 3, meaning the tool spindle 14, projects vertically from the sieve bottom 10. Around the circumference of the sieve holder 5 it is also possible to recognize the cutouts 13 which serve to support the sieve holder 5 on the ribs 7 fitted around the inner circumference of the container body 2.

Figure 5:
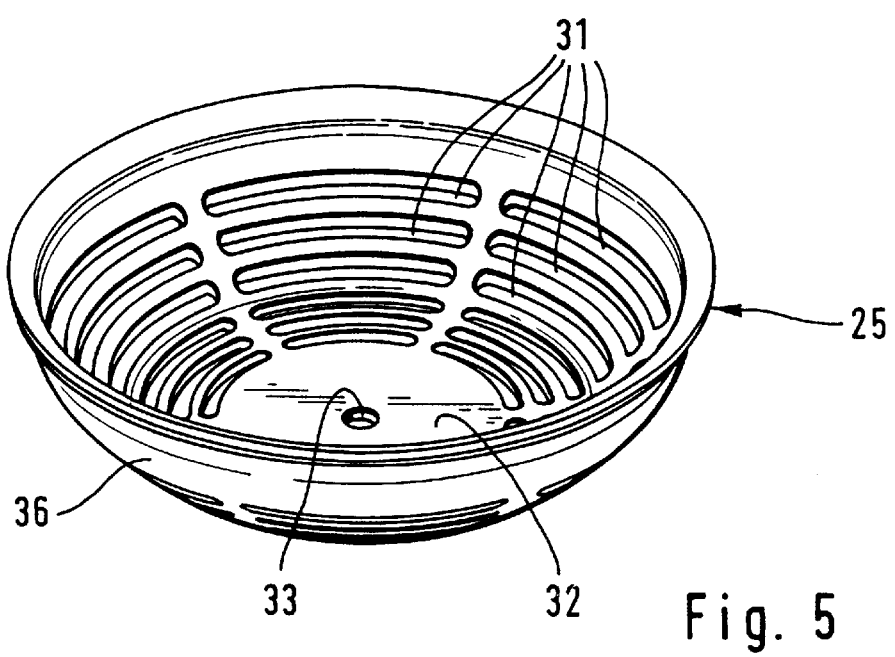
FIG. 5 is a perspective view of an alternative sieve.

FIG. 5 shows a further embodiment, namely a fine sieve 25 in which the width of the slits 31 is smaller than that of the slits 9 shown in the previous Figures. Visible in the sieve bottom 32 is a hole 33 in which a suitable bearing pin for a tool spindle may be anchored.

Figure 6:
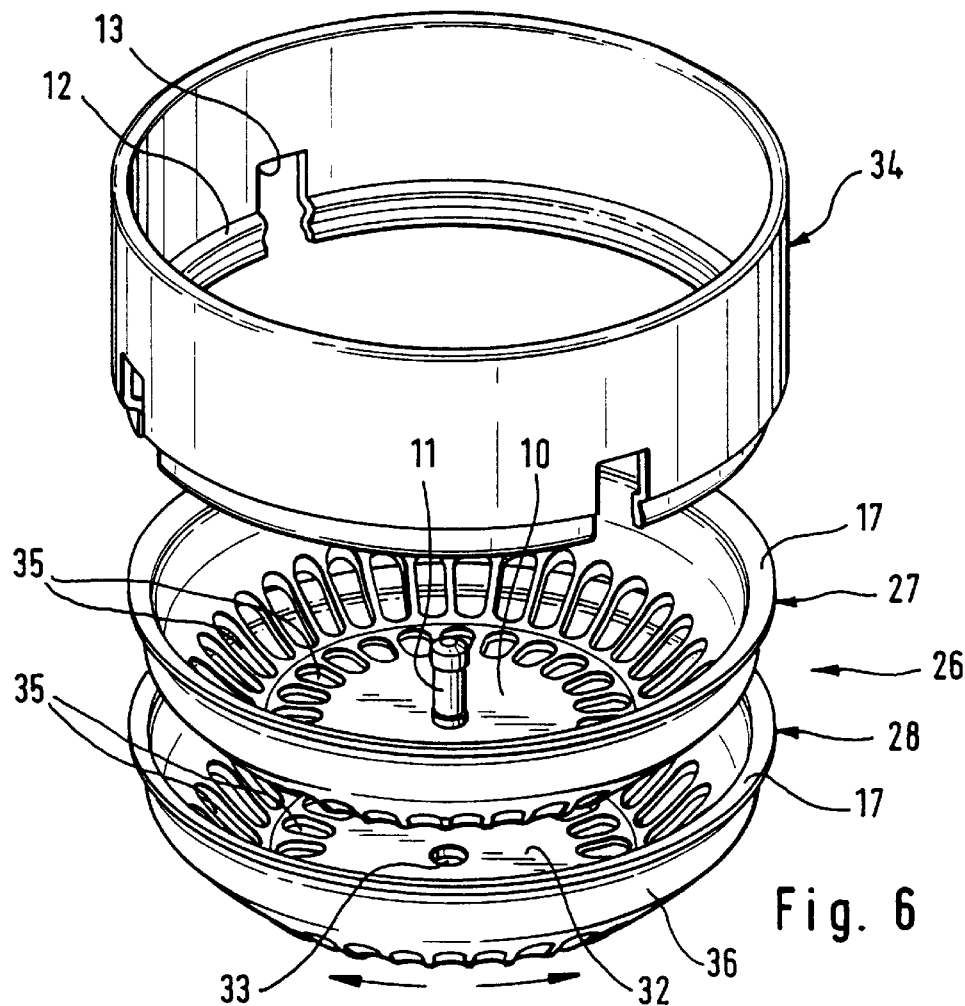
FIG. 6 is an exploded perspective view of a further alternative adjustable sieve and a sieve holder.

FIG. 6 shows another alternative embodiment of an advantageous sieve, namely an adjustable sieve 26. A circular-ring-shaped sieve holder 34 is shown in addition to the frusto-conical adjustable sieve 26. The adjustable sieve 26 is comprised of an inner sieve 27 and an outer sieve 28, both of which are constructed similar to the sieves 4 and 25 in FIGS. 4 and 5. Unlike these sieves, however, the inner sieve 27 and the outer sieve 28 have transverse slits 35 extending in radial direction. Furthermore, the inner sieve 27 has at the center of its circular sieve bottom 10 a vertically projecting bearing pin 11. This bearing pin 11 has at its lower end an anchorage, not shown, which is received by a hole 33 in the sieve bottom 32 of the outer sieve 28. Hence the bearing pin 11 forms not only a part of the sliding bearing for the tool shank but also at the same time the rotary axle for turning the inner sieve 27 relative to the outer sieve 28.

During assembly, the inner sieve 27 is received by the outer sieve such as to enable it to be turned. The outer sieve 28 is received in turn by the sieve holder 34, which corresponds to the sieve holder 5 and similarly has circumferentially spaced cutouts 13. Furthermore, the sieve holder 34 has at its inner lower rim a collar 12. After assembly, the inner sieve 27 may be turned in circumferential direction relative to the outer sieve 28 as indicated by the arrows in FIG. 6. The corresponding transverse slits 35 are thus moved relative to each other. In this way the width of the slits is varied, i.e., the throughput capacity of the adjustable sieve 26 is increased or decreased accordingly.

Figure 7:
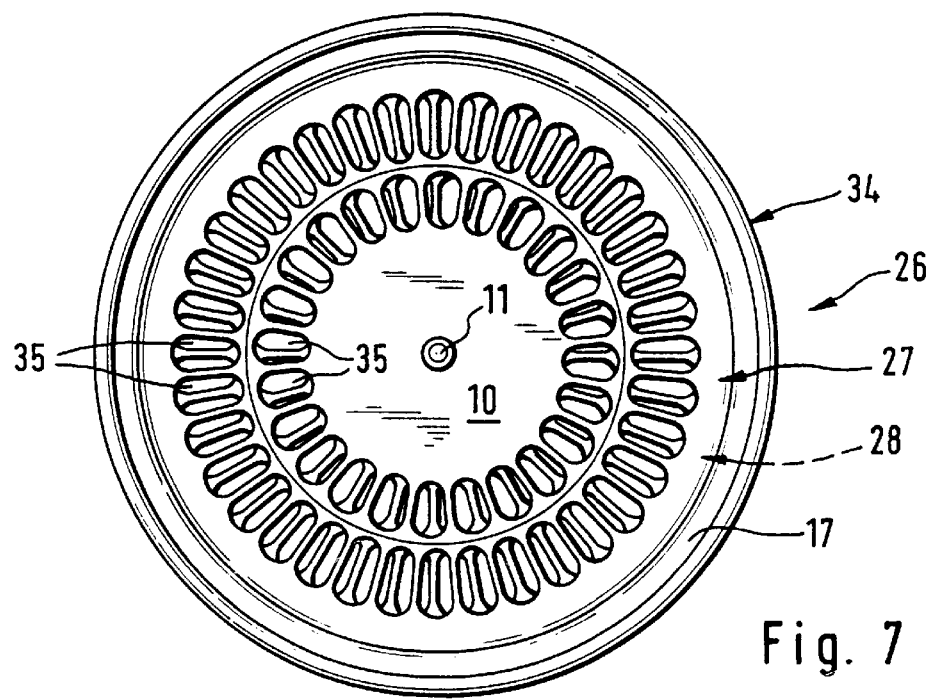
FIG. 7 is a plan view of the adjustable sieve of FIG. 6.

FIG. 7 shows a plan view of the adjustable sieve 26. The transverse slits 35 are slightly covered, i.e., the inner sieve 27 is turned relative to the outer sieve 28 so that they no longer register.

What is claimed is:

1. A device for chopping food, said device comprising:
   a chopping tool for reducing the food, said chopping tool formed by a rotary blade on a tool spindle;
   a container body subdivided into an upper processing zone and a lower collecting zone, said processing zone accommodating said chopping toot, said container body including a sieve having a bottom with a bearing surface provided thereon, said sieve separating the processing zone from the collecting zone, and the tool spindle having its lower end rotatably mounted on the bearing surface.

2. The device as claimed in claim 1, wherein the sieve is of a cup-shaped configuration having openings formed in the bottom of the sieve and/or in a side wall of the sieve.

3. The device as claimed in claim 2, wherein the openings are formed in the side wall of the sieve and the chopping tool is arranged level with the openings formed in the side wall.

4. The device as claimed in claim 1, wherein the sieve is adjustable such as to enable different throughput capacities to be adjusted.

5. The device as claimed in claim 1, wherein the container includes a sieve holder receiving the sieve at its lower end.

6. The device as claimed in claim 5, wherein projecting ribs are provided on a wall of the container for engagement with cutouts provided on the sieve holder.

7. The device as claimed in claim 1, wherein the chopping tool includes a plurality of blades, and said blades are formed in such manner that the forces acting on the food during chopping are directed towards openings in the sieve.

8. The device as claimed in claim 7, wherein the blades are circumferentially spaced apart on an outer periphery of the tool spindle, each blade being bent at a different angle.

9. The device as claimed in claim 7, wherein the chopping tool includes only four blades, and said blades are formed in such manner that the forces acting on the food during chopping are directed towards the openings in the sieve.

10. The device as claimed in claim 1, wherein the chopping tool includes a coupling device, which is adapted to be connected with an output of an electrically operated kitchen appliance.

11. The device as claimed in claim 1, wherein the sieve is interchangeable.

12. The device as claimed in claim 1, wherein the bearing surface comprises a pin.

13. An ice-chopping device comprising:
   a container defining first and second discrete compartments therein;
   a lid covering the first compartment, the lid being removable to expose the first compartment for filling the first compartment with ice;
   a drive unit disposed above the lid, opposite the first compartment;
   a chopping tool disposed within the first compartment, the chopping tool having blades for chopping ice within the first compartment and comprising a tool spindle coupled to the drive unit for rotation, the tool spindle having a pin mount: and
   a sieve at least partially separating the first compartment from the second compartment, such that chopped ice falls through the sieve from the first compartment into the second compartment, the sieve comprising a bearing pin projecting upward therefrom, wherein the bearing pin is received upon the pin mount of the tool spindle for rotation thereupon.

14. The ice-chopping device of claim 13, wherein the tool spindle is coupled to the drive unit by a spline.

15. The ice-chopping device of claim 13, wherein the sieve is cup-shaped and wherein there are holes in at least one of a bottom and a side wall of the sieve.

16. The ice-chopping device of claim 15, wherein the chopping tool is level with holes in the side wall of the sieve.

17. The ice-chopping device of claim 16, wherein the chopping tool includes multiple blades, and wherein the blades are positioned to push chopped food toward the holes in the sieve.

18. The ice-chopping device of claim 17, wherein the blades are circumferentially spaced along a periphery of the tool spindle, and wherein each blade is bent at a different angle.

19. The ice-chopping device of claim 18, wherein the chopping tool has four blades.

20. The ice-chopping device of claim 13, wherein the sieve is adjustable for different throughput capacities.

21. The ice-chopping device of claim 13, wherein the sieve is held in place by a sieve holder disposed directly above the sieve.

22. The ice-chopping device of claim 21, wherein the sieve holder comprises a sleeve disposed about a periphery of the first compartment.

23. The ice-chopping device of claim 22, wherein the sieve holder defines cutouts positioned to receive ribs projecting from an interior wall of the container.

24. The ice-chopping device of claim 13, wherein the sieve is configured to be removed and replaced.

25. The ice-chopping device of claim 13, wherein the lid is formed by a housing containing the drive unit.

26. A kitchen accessory for chopping ice, the accessory comprising:
 a sieve bowl having a rim and defining therethrough an array of circumferentially elongated holes for the passage of crushed ice into a compartment defined below the bowl, with the bowl supported by its rim;
 a bearing pin extending into the bowl from a lower inner surface thereof; and
 a blade spindle having a central shaft defining a hole in a lower end thereof for receiving the bearing pin, and a blade extending from a region of the shaft adjacent the lower end, the blade arranged to rotate adjacent an inner surface of the sieve bowl when the spindle is rotated upon the bearing pin, to chop ice placed within the bowl.

27. The kitchen accessory of claim 26, wherein the sieve bowl is adjustable such as to enable different throughput capacities to be adjusted.

28. The kitchen accessory of claim 26, wherein the blade spindle includes a plurality of blades, and said blades are formed in such manner that the forces acting on the ice during chopping are directed towards openings in the sieve bowl.

29. The kitchen accessory of claim 28, wherein the blades are circumferentially spaced apart on an outer periphery of the blade spindle, each blade being bent at a different angle.

30. The kitchen accessory of claim 26, wherein the blade spindle includes a coupling device, which is adapted to be connected with an output of an electrically operated kitchen appliance.

31. The kitchen accessory of claim 26, wherein the blade spindle includes only four blades, and said blades are formed in such manner that the forces acting on the ice during chopping are directed towards openings in the sieve bowl.

32. A method for chopping ice, comprising:
 (a) providing a chopping device comprising:
  a container including first and second discrete compartments separated by a sieve defining a plurality of holes therethrough;
  a tool spindle disposed within the first compartment and having at least one blade secured to the tool spindle for rotation therewith; and
  a removable lid covering the first compartment, the lid including a drive motor for rotating the spindle with the lid in place over the first compartment;
 (b) removing the lid to expose the first compartment;
 (c) placing ice in the first compartment;
 (d) replacing the lid; and then
 (e) chopping the ice by activating the drive motor to rotate the tool spindle, thereby forming pieces of ice that fall through the sieve holes into the second compartment.

33. The method of claim 32, further comprising adjusting the sieve to adjust different throughput capacities.

34. The method of claim 32, further comprising removing and replacing the sieve.

* * * * *